May 7, 1946. W. T. FERGUSON Re. 22,752
STEAM HEATING SYSTEM AND CONTROL VALVE THEREFOR
Original Filed April 25, 1940
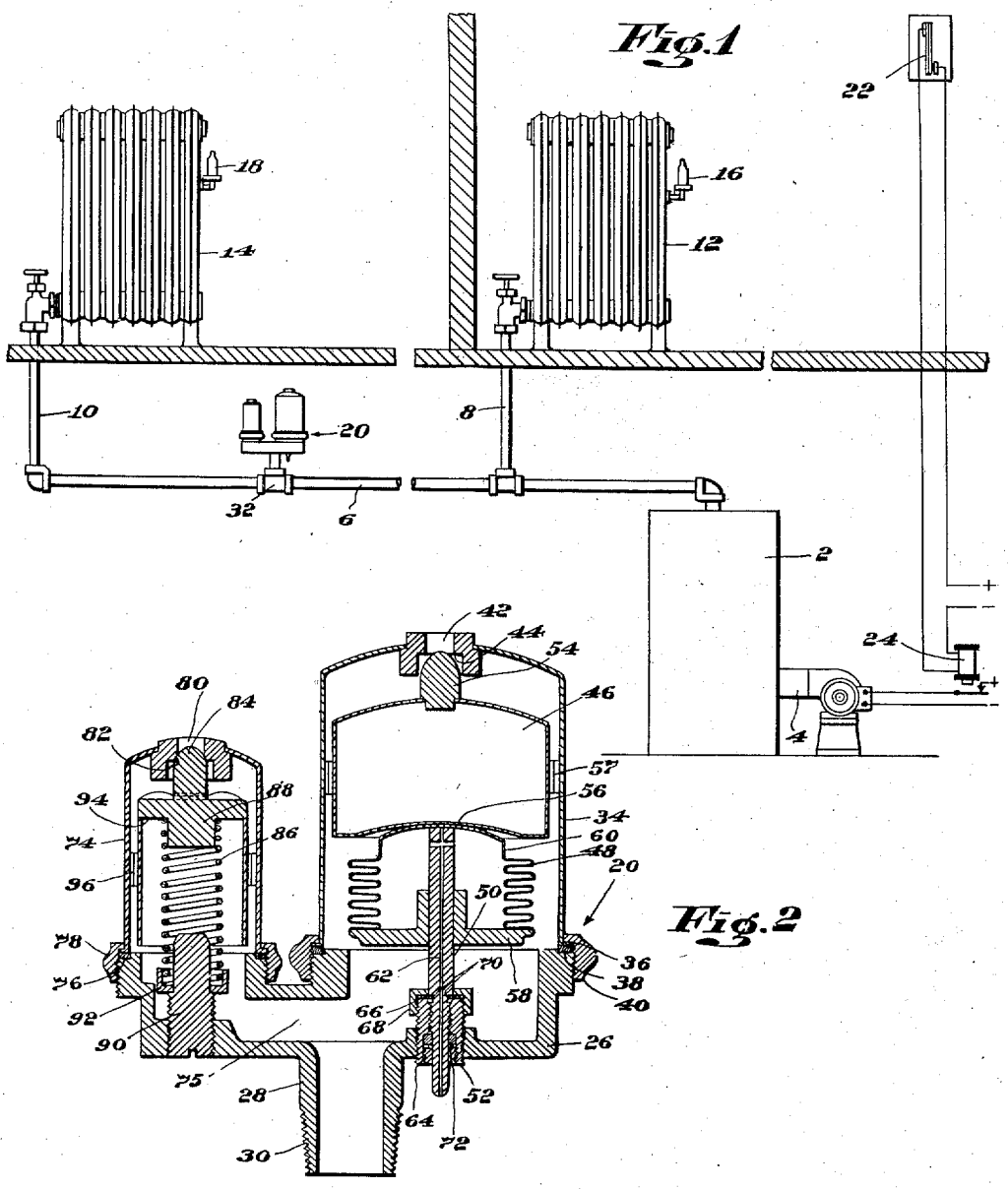
INVENTOR
WARREN T. FERGUSON
BY Clyardley Chittick
ATTORNEY Reissued May 7, 1946

Re. 22,752

UNITED STATES PATENT OFFICE 22,752

STEAM HEATING SYSTEM AND CONTROL VALVE THEREFOR

Warren T. Ferguson, Newton Highlands, Mass., assignor to Anderson Products, Inc., Cambridge, Mass., a corporation of Massachusetts Original No. 2,378,760, dated June 19, 1945, Serial No. 331,506, April 25, 1940. Application for reissue November 30, 1945, Serial No. 631,817

22 Claims. (Cl. 237—9)

This invention relates to heating systems, and includes both the apparatus and method.

The invention relates particularly to steam heating systems and may be used in connection with both the so-called one pipe or two pipe systems.

One of the objects of the invention is to produce a low cost steam heating system which will have the attributes of proper distribution of heat and economical operation.

Another object of the invention is to provide a steam heating system arranged to operate so that the rate of heat transfer from the steam to the radiators will be relatively high during the heating cycle, and further to provide means for controlling the heat output of the radiators whereby the temperature of the spaces to be heated may be held more nearly uniform than heretofore.

A further object of the invention is to provide, in a steam heating system, all of the benefits of the so-called vacuum system, coupled with the additional benefits that may be derived from the use with a vacuum system of a vacuum control valve.

It is well understood by those skilled in the steam heating art that, in vacuum systems which toward the end of the heating cycle have a rather high vacuum therein, it is desirable at the start of the next heating cycle to reduce the pressure in the system to atmospheric quickly so that the newly created steam will travel to the several radiators in accordance with the setting of the vent valves thereon.

A heating cycle as used in connection with this invention is intended to mean one complete cycle comprising two parts: first, the firing part of the cycle, referred to hereinafter as the firing cycle; and, secondly, the off part of the cycle, referred to hereinafter as the off cycle.

The commencement of the firing cycle may be considered as either the time heat is supplied to the boiler in quantities sufficient to produce steam thereafter or the time steam actually becomes available, while the end of the firing cycle may be considered as occurring at the time of cessation of operation of the heat source or the cessation of the normal supply of steam.

In the ordinary situation, a room thermostat calls for heat, setting in full operation an oil burner, an automatic stoker or other heating source, or the thermostat may cause the opening of a valve connected to a steam source. In the first situation, there will be a lapse of a few minutes between the times heat is supplied and steam is generated, while in the second, steam will be supplied immediately.

For the purposes of this application, unless otherwise noted, reference to the commencement of the firing cycle may be taken to mean the start of operation of the heat supplying source, whether or not time elapses thereafter before steam becomes available.

Through the use of a vacuum control valve, which operates automatically at or about the commencement of each heating cycle, coupled with the use of adjustable venting valves on the radiators, it is well known that steam distribution can be adequately controlled so that cold rooms will receive greater quantities of heat than warm rooms, all of which results in controlled heating of the building.

In the ordinary vacuum system, the vacuum that is formed during the off cycle is dependent solely upon the degree of tightness of the system and the time that elapses before the room thermostat calls for additional heat. In the average case, the negative pressure that will develop in a system after the discontinuance of the heat supply and prior to the commencement of the next cycle will be substantial.

Experiments have shown that, as the vacuum in a system increases, the heat content of a given volume of steam decreases, with the result that the amount of heat that may be transferred to radiators by vapors under a large negative pressure is so small that the radiators practically cease to have any effect in maintaining the room temperature.

A further object of the invention, therefore, is to provide means for and a method of heating in which, as long as there is heat available from the heat source during any cycle, the pressure in the system will be maintained at a point where the heat content of the steam will be such that the radiators, during the off cycles, will give off heat in sufficient quantities to appreciably assist in the maintenance of room temperature.

A further object is to provide in addition a relatively low cost vacuum control valve which will operate automatically under the control of system temperatures and pressures and which will come into operation to introduce atmospheric pressure to the system prior to the distribution of steam to the radiators on the next cycle.

In effect, therefore, it is the object of this invention to generally improve the quality of the results that may be obtained from steam heating systems. The equipment involved does not necessitate any changes in ordinary existing equipment other than the use of so-called vacuum type valves on the radiators and a vacuum control valve that will be hereinafter described and which is claimed as part of the invention.

These and other objects of the invention will appear as the description proceeds with the aid of the accompanying drawing, in which:

Fig. 1 is a diagrammatic showing of a typical one pipe steam heating system.

Fig. 2 is a cross-sectional elevation of the vacuum control valve used in connection with this system and which brings about the indicated operation.

Referring to Fig. 1, in which is shown a typical one pipe steam heating system, although it should be understood that the invention will work equally well in connection with a two pipe system, there is provided a steam boiler 2 and a source of heat 4, which in this case is shown as a typical gun type oil burner. However, any other automatically controlled steam source could be used. Extending from the boiler is the steam main 6, which branches off in the risers 8 and 10 to connect with radiators 12 and 14 which are positioned in the enclosed spaces to be heated.

On the radiators 12 and 14 are venting valves or vents 16 and 18 of the customary and well-known vacuum type. By that it is meant that the valves are of the type which vent air from the radiators upon the entrance of steam to the latter, but which automatically close through the operation of a thermostatic element within the valve when the steam arrives thereat and thereafter remain closed while a negative pressure prevails in the system. Furthermore, these valves are preferably adjustable so that the rate at which air is vented from the radiators may be varied. A valve suitable for use in this connection is shown in the patent to Lasher et al., No. 2,163,909. The vacuum type valves 16 and 18, above referred to, are customarily constructed to close under conditions of negative pressure that may develop following the end of a heating cycle, whether or not they have been closed by heat during the heating cycle. This feature is necessary because it sometimes happens that the controlling thermostat will operate to cut off the supply of steam before all of the radiators have become heated.

Positioned on main 6 is the vacuum control valve 20 which is shown in detail in Fig. 2 and which will be more particularly described hereinafter.

The particular location of vacuum control valve 20 is relatively immaterial except that it should preferably be some place where steam supplied after commencement of the firing cycle will reach it in due course to cause it to close. In the ordinary case, the vacuum control valve may be positioned at any convenient place on the main and may take the place of a main vent.

The operation of oil burner 4 is under the control of a room thermostat 22 of the usual type, which, upon increase or decrease of room temperature beyond predetermined limits, operates to stop or start the oil burner. This is accomplished through the use of well-known electric circuits, and in this instance the operation is shown diagrammatically through the use of a relay 24 which operates to open or close the circuit to the oil burner, depending upon the requirements called for by the thermostat 22.

Referring now to Fig. 2, the construction of the vacuum control valve 20 is as follows. The base 26, which may be of any suitable shape, has extending downwardly therefrom a nipple 28 threaded at 30 for connection with a fitting 32 (Fig. 1) interposed in the main 6. Mounted on base 26 is a cylindrical shell 34 maintained in tight connection with the base through an outturned bottom flange 36 which rests on gasket 38 and is held tightly thereagainst by nut 40. The joint formed thereby is air-tight, water-tight and steam-tight.

The upper end of shell 34 is closed except for port 42, which is constructed so as to include a valve seat at 44.

Mounted within shell 34 is a thermostatic float 46 carried in turn by an expansible bellows 48, which bellows is supported by a hollow stem 50 designed, through the mechanism disclosed generally at 52, for limited vertical adjustment.

On the top of float 46 is mounted a valve pin 54 which can make air- and water-tight engagement with valve seat 44. Thermostatic float 46, containing a small quantity of volatile liquid such as alcohol, is shown in its contracted position in which the bottom 56 thereof is curved upwardly. Upon the application of sufficient heat to this float, the volatile liquid will vaporize, forcing bottom 56 outwardly, which will result in upward movement of the float body and valve pin 54 to cause engagement of the latter with valve seat 44. If water should fill the shell, the float 46, being buoyant, will rise to close port 42, preventing leakage. The float is directed in its movement by guide 57.

The expansible bellows 48, made according to the usual bellows construction and of a wall thickness great enough to give the desired characteristics, is mounted on and sealed to a circular base plate 58. Extending upwardly through the center of the base plate is the support 50 which is fixed with respect to base plate 58 and extends upwardly a suitable distance so that the upper end 60 of bellows 48 may rest thereagainst. In this manner, support 50 acts as a stop to prevent further collapse of the bellows under the load imposed upon it by thermostatic float 46. It will also be noted that support 50 is hollow, as at 62, the orifice provided thereby extending from the atmosphere to the interior of the bellows. Because of this construction, the pressure within the bellows is at all times atmospheric. Support 50, when initially adjusted within base plate 58, is set so that the upper end 60 of the bellows presses thereon with greater or less force, depending on the negative pressure within the vacuum control valve at which it is desired to cause initial expansion of the bellows.

In order to adjust the normal clearance between valve pin 54 and valve seat 44, support 50 is made adjustable with respect to the base 26 through the mechanism generally shown at 52, which in particular consists of a sleeve 64 threaded externally for adjustable engagement with the base and internally for adjustable engagement with support 50. Secured against the upper end of sleeve 64 is a split washer 66 held in position by the collar 68. Washer 66 extends about support 50 and is located within the confines of the short circumferentially extending groove 70. It is obvious that by this arrangement support 50 may be screwed up and down within sleeve 64 a limited amount. To prevent leakage suitable washers and a gland nut are provided at 72.

Through the provision of the adjusting mechanism just described, the valve closing means comprising the valve pin 54, thermostatic float 46 and bellows 48, may be adjusted vertically. It is apparent that port 42 will be closed or opened by expansion or contraction of the bellows, depending upon the relation of the negative pressure of the system to the adjustment of the valve. That is to say, if the valve is adjusted downwardly to increase the distance between valve pin 54 and seat 44, it will require a greater negative pressure to elongate bellows 48 sufficiently to close the valve than would be the case if valve pin 54 were adjusted to a less open position. This assumes, of course, that float 46 is in contracted position at the time.

Mounted elsewhere on the base is a second shell 74 ordinarily of smaller size than shell 34. Both shells are, of course, directly connected with nipple 28 through a common connecting passageway, although it is to be understood that separate connections to the steam main could be provided. The intent is that both shells shall be subject to whatever effects may be present within the steam main.

The shell 74, through a suitable washer 76 and nut 78, is held in position in the same water-, air- and steam-tight manner as shell 34. A port 80 to the atmosphere at the upper end of shell 74 is constructed to provide a valve seat 82. Port 80 is normally closed through engagement of a valve pin 84 with valve seat 82, and the parts are maintained in this condition through the use of a spring 86 which exerts a continuous upward pressure against a plug 88 on which valve pin 84 is mounted. For the purpose of holding spring 86 in located position and providing an adjustment for the spring pressure, a spring stem 90, with a spring supporting cup 92, is in threaded engagement with base 26 and has its upper end extending a limited distance into the lower end of spring 89. Stem 90 is, of course, in fluid-tight relation to the base, and if necessary, a suitable packing arrangement of ordinary construction could be added to insure that no leakage could occur. Ordinarily, in the field, stem 90 is soldered into place, eliminating further adjustment, as a suitable maximum negative pressure at which the valve is to bleed can be generally determined upon.

Affixed to and depending from plug 88 is a shroud 94 in the form of a cylindrical tube open at its lower end. Surrounding shroud 94 is a guide 96 which assists in directing valve pin 84 toward valve seat 82.

From the description set forth it can be seen that the upward pressure exerted against valve pin 84 may be varied through adjustment of spring stem 90. It is contemplated in this invention, however, that no adjustment of spring stem 90 will be made by users, for after suitable adjustment has been made at the factory, further adjustment would ordinarily be unnecessary and inadvisable.

In Fig. 2 the mechanism within shell 34 will hereinafter be referred to as the thermostatic pressure control, while the mechanism within shell 74 will be referred to as the bleeder.

The general purpose of vacuum control valve 20 is to provide means through the mechanism within shell 34 of closing the system at this point to the atmosphere under conditions of suitable temperature through the expansion of thermostatic float 46, and to thereafter maintain the system closed through the cooperation of expansible bellows 48 after the temperature has dropped and float 46 has contracted and while a negative pressure greater than a predetermined degree prevails. The bleeder mechanism within shell 74 which operates to maintain port 80 normally closed is provided for the purpose of preventing negative pressures within the system from exceeding a predetermined amount. It is believed apparent that when the pressure within shell 74 decreases to a predetermined degree, the atmospheric pressure against valve pin 84 will result in opening port 80 to admit atmospheric air to the system until the pressures on the valve pin 84 are equalized.

Thus the vacuum control valve 20 serves two broad purposes: one, to close the system under temperature and to maintain it closed under conditions of negative pressure greater than a predetermined degree, and, two, to limit the degree of negative pressure that may be developed within the system. The particular use of this unit will be set forth in connection with the following description of the operation of the heating system with which it is employed.

Assume the rooms to be cold. Room thermostat 22 will call for heat, thereby closing relay 24 and putting oil burner 4 in operation. Steam, generated in boiler 2, commences to flow along main 6. At this point, port 42 is open and port 80 is closed. Steam will enter shell 34 through nipple 28 to raise the temperature of thermostatic float 46. When the necessary temperature is reached, float 46 will expand, causing port 42 to be closed. This condition will thereafter be continuously maintained until after the steam supply has been discontinued. Steam will continue to flow along main 6, up risers 8 and 10 to radiators 12 and 14, forcing ahead and out through vents 16 and 18 such air as may be in the radiators.

In due course, when the radiators are filled with steam, vents 16 and 18 will automatically close, and the room in which thermostat 22 is located will be warmed sufficiently to indicate the discontinuance of heat, whereby thermostat 22 will be actuated, relay 24 will be opened and the oil burner will stop. This results in the discontinuance of the generation of steam, the radiators begin to cool as they dissipate their heat to the surrounding air, and the steam within the system is rapidly condensed, resulting in the development of a negative pressure. Vents 16 and 18, being of the vacuum type, will remain closed under conditions of negative pressure, even though the temperature at the vents may have fallen below the closing temperature.

Depending upon the tightness and size of the system and other factors such as rate of radiation, outdoor temperature, wind, insulation, etc., the negative pressure will develop more or less rapidly. It is contemplated through the use of vacuum control valve 20 that when the negative pressure has reached a predetermined point, say, for example, a negative pressure of ten inches of mercury, port 80 will be opened automatically to admit atmospheric air to the system. As soon as sufficient air has been admitted to reduce the negative pressure to ten inches or less, then port 80 will be closed automatically. If, as more steam condenses, the negative pressure again increases beyond ten inches of mercury, then port 80 will again open to admit more atmospheric air. Thus the bleeding mechanism within shell 74 repeatedly opens and closes port 80 to limit the maximum negative pressure in the system at substantially ten inches of mercury.

Finally there comes a time when the steam is substantially all condensed so that further vacuum cannot be drawn, with the result that the negative pressure holds substantially constant for a while, followed by gradual dissipation due generally to slight leakages in the system.

Following the discontinuance of the steam supply, the situation that prevails within shell 34 is this. The temperature of the thermostatic float 46 gradually decreases and at a predetermined degree bottom 56 will snap upwardly, thereby tending to open port 42. However, such opening does not take place because at that time the difference between the atmospheric pressure against the interior of the bellows and the negative system pressure against the exterior of the bellows is such as to cause instant elongation of bellows 48. The critical negative pressure at which opening and closing of port 42 takes place under the influence of the bellows is set by adjustment of support 50 at a pressure which is slightly less negative than the negative pressure at which port 80 opens.

For example, if port 80 is arranged to open at the heretofore suggested negative pressure of ten inches of mercury, bellows 48 might be adjusted to elongate sufficiently to maintain port 42 closed at negative pressures in excess of eight inches of mercury. It has been found that, in practically all systems that are reasonably tight at the time thermostatic float 46 collapses after the discontinuance of steam, a negative pressure sufficient to elongate the bellows 48 will be present. Hence port 42 remains continuously closed during the first portion of the off cycle.

During the off cycle it is contemplated that port 42 shall remain closed until the negative system pressure has become less negative than a predetermined degree, as, for example, the eight inches of mercury previously referred to. The temperature of the system during the off cycle does not control the reopening of port 42. That is to say, even though the system temperature may fall sufficiently to cause float 46 to contract, still port 42 will not be opened, because at that time the negative pressure in the system will be adequate to maintain bellows 48 elongated. At the commencement of the off cycle, the temperature at the vacuum control valve will commence to drop and at the same time the negative pressure will begin to build up. It is necessary that the valve be so adjusted that the negative pressure created by the time the temperature at float 46 has dropped enough to cause contraction thereof is adequate to cause sufficient elongation of bellows 48 to maintain port 42 closed. This is accomplished by constructing thermostatic float 46 to operate at a relatively low temperature of 130° to 140° F., that is to say, a temperature considerably below the temperature at which the thermostatic floats in the radiator air valves 16 and 18 operate. In this way port 42 will be maintained closed by float 46 for a period long enough to permit the development of a negative pressure at least equal to the predetermined degree of, say, eight inches of mercury, which is necessary to cause sufficient elongation of bellows 48 to main tain port 42 closed following collapse of float 46.

It should be pointed out that the vacuum valves 16 and 18 differ materially from vacuum control valve 20 in that they are constructed to close at high temperatures—175° F. or higher—and to be maintained closed by low negative pressures in the neighborhood of one inch of mercury or less.

As heat is dissipated, further condensation takes place tending to increase the negative pressure, but this is limited by the operation of the bleeding mechanism. Finally there comes a time when further development of vacuum becomes impossible, at which time the negative pressure within the system begins to decrease below ten inches of mercury, due usually to slight leakage. Obviously, the negative pressure will reach, in due time, eight inches of mercury. Since this is the degree of negative pressure necessary to maintain bellows 48 elongated, a further decrease in pressure below that point will result in a collapse of bellows 48 and consequent reopening of port 42. Upon this happening, the entire system will be charged with air and the pressure automatically reduced to atmospheric.

In the meanwhile, the temperature of the room in which thermostat 22 is located has been gradually decreasing, with the result that sooner or later the thermostat again calls for heat, putting burner 4 in operation. When this happens, steam is again generated and the cycle heretofore described is repeated.

However, under certain conditions of radiation thermostat 22 may call for heat before port 42 has reopened under normal dissipation of negative pressure from the system. When this occurs, the boiler will go into operation while the negative pressure within the system is at some point between eight inches and ten inches of mercury. This fact, nevertheless, in no way adversely affects the operation, because as low pressure vapor is generated, the negative pressure will be dissipated very quickly to the extent of two inches of mercury, which will bring the negative pressure below eight inches, to result in the reopening of port 42. All this will always take place before any steam reaches any of the radiators, and the inrush of atmospheric air will at once condense the developing low pressure vapors so that the generation of steam will be delayed until the boiler water has been brought up to 212° F.

The reason for recharging the system on each cycle is to provide an air buffer ahead of the steam, which air must be forced from the radiators by the oncoming steam before vents 16 and 18 can be closed. Since vents 16 and 18 have been adjusted to control the rate of air escape, it is obvious that steam will reach radiators 12 and 14 in accordance with the rate of escape of air from the respective radiators. Discharge of air through the vents of the radiators, which is necessary for controlled distribution of steam, can only come into operation if the system is recharged on each cycle.

Having now described the general operation of the system, the particular advantages of limiting the negative pressure that may be developed and the reasons for reopening the system to the air at a decreasing negative pressure only a small amount below the maximum limit determined by the bleeder will be pointed out.

In providing uniformity of heating in a room or building using a steam heating system of the so-called vacuum type, minimum variations in temperature may be secured by providing minimum variations in the heat supplied through the radiators. That is to say, if heat could be supplied at a rate exactly equal to the rate of radiation of the room, the temperature would remain constant. Thus the smaller the range of temperature of a given radiator from the commencement of a heating cycle to the end of the time at which appreciable heat is given off by the radiator, the less will be the fluctuation in room temperature during that period.

By the present invention in which the negative pressure that may develop in the system is limited through the use of the bleeder valve, it follows that the temperature of the radiators will be maintained at substantially a constant temperature following the arrival of the system pressure at the predetermined limited negative degree, so long as there is sufficient heat available in the boiler water to cause generation of steam at the aforesaid negative pressure.

From experiment it is known that in a vacuum system the temperature of the boiler water following the firing cycle drops rapidly over the first portion of the off cycle, and during this time substantial quantities of additional vapors are given off which may be utilized for maintaining the temperature of the radiators.

If the vacuum, that immediately develops after the firing cycle, is unlimited and reaches a high degree, say, for example, twenty-five inches of mercury or more, the available heat from the boiler is not effectively transferred to the radiators because a given volume of steam at that pressure weighs only a third as much as the same volume of steam at atmospheric pressure and likewise has a B. t. u. content of about one-third. Hence the B. t. u.'s transferable to the radiators while this high negative pressure prevails is about one-third of steam at atmospheric pressure, and the temperature of the radiators will drop rapidly to a point far below the temperature that prevails during the firing cycle.

If, however, the negative pressure is limited to ten inches of mercury, for example, more heat will be transferred to the radiators than if the negative pressure were greater, as, for example, twenty-five inches of mercury. Thus, by limiting the negative pressure, the heat output of the radiators will be greater and the room temperature will decrease more slowly than would be the case otherwise.

Through the vacuum control valve 20 predetermined upper and lower limits of negative pressure may be selected, the upper limit being chosen to provide a satisfactory radiator temperature when the system is sealed during the off cycle and the lower limit being chosen to provide positive recharging with air before the advent of steam on the next firing cycle.

After the temperature of the boiler water has dropped to a point where it can no longer supply steam at the limited negative pressure, then the radiator temperatures will drop rapidly to approach room temperature, as no further heat will be available. This brings about two situations: first, the room temperature will be accelerated downwardly to operate the thermostat to again bring the heat supply into operation; and secondly, it will cause reopening of the system to the atmosphere as soon as the negative pressure has been dissipated to the predetermined minimum of eight inches of mercury, for example, through leakage or through a rising boiler water temperature. That is, the valve, through the contraction of bellows 48 upon reduction of the negative pressure of the system, reopens to flood the system with air at atmospheric pressure. This procedure in turn resets the system for the oncoming steam supply, so that there will be proper steam distribution.

Whether the maximum negative pressure should be ten inches of mercury and the reopening pressure eight inches may be found by test on any given system. Ten inches, however, is a good maximum figure, as it provides reasonably good heat output from the radiator, since the heat content of a given volume of steam at that pressure is only about one-third less than the heat content at atmospheric. At the same time, ten inches of negative pressure is sufficient to cause vapors to be given off by the boiler water in such quantity that the vapors will travel readily to the several radiators. That is to say, a negative pressure of ten inches, which will be quickly reached as compared with the fall in temperature of the boiler water, will insure the continued transfer of a substantial amount of heat from the boiler to the radiators after the commencement of the off cycle. The minimum pressure may be somewhat more than two inches less than the maximum, but it should be close enough so that if vacuum control valve 20 has not already opened at the start of the next firing cycle, it will open promptly thereafter so that the system will be recharged with air before steam is supplied.

The adjustments provided enable both the maximum negative pressure and the minimum reopening pressure to be accurately controlled.

In the specification and claims, when reference is made to negative pressures, it is to be understood that the negative pressures are considered in relation to zero or atmospheric pressure. That is to say, a negative pressure of ten inches of mercury is a greater negative pressure than five inches of mercury. Putting it in different words, the greater the degree of vacuum, the greater is the negative pressure. When reference is made herein to the valves in the control unit 20 being in parallel, it is intended only to indicate that the valves are parallel functionally, and it is not intended as a limitation to any particular geometrical relation of the valves.

I claim:

1. A method of heating by steam, utilizing a system comprising a plurality of radiators with vents thereon and an intermittently operating source of steam, in which each cycle comprises the following steps: setting the source of steam in operation; supplying radiators with steam; sealing the system before or about the time the steam source ceases operation; discontinuing the supply of steam; then allowing the steam to condense to create a substantial negative pressure; maintaining said negative pressure at a substantially uniform predetermined degree; and finally opening said system to the atmosphere prior to distribution of steam to the radiators on the next heating cycle.

2. A method of heating by steam as set forth in claim 1, in which the negative pressure that is created is substantial, but is not in excess of twelve inches of mercury.

3. A method of heating by steam as set forth in claim 1, in which the maximum negative pressure that is allowed to develop after the discontinuance of steam is between six inches and twelve inches of mercury.

4. A method of heating by steam as set forth in claim 1, in which the opening of said system to the atmosphere takes place when the negative pressure has decreased not more than four inches of mercury from the maximum negative pressure that is permitted to develop.

5. A method of heating by steam utilizing a system comprising a plurality of radiators with vents thereon and an intermittently operating source of steam, in which each cycle comprises the following steps: setting the source of steam in operation; supplying the radiators with steam; sealing the system before or at about the time the steam source ceases operation; discontinuing the supply of steam; then allowing the steam to condense to create a substantial negative pressure; bleeding limited amounts of air into the system when the negative pressure exceeds a predetermined maximum, to reduce the negative pressure therebelow; and finally opening said system to the atmosphere when the negative pressure has decreased to a predetermined minimum, the system being sealed when the negative pressure is between said maximum and minimum.

6. A method of heating by steam as set forth in claim 5, in which the difference in pressure between said maximum and minimum does not exceed five inches of mercury.

7. A method of heating by steam utilizing a system comprising a plurality of radiators with vents thereon and an intermittently operating source of steam, in which each cycle comprises the following steps: supplying radiators with steam; sealing the system before or about the time the steam source ceases operation; discontinuing the supply of steam; then allowing the steam to condense to create a substantial negative pressure; limiting the development of negative pressure beyond a predetermined maximum; setting the source of steam in operation; generating sufficient steam to reduce the negative pressure of the system to a predetermined minimum; and then opening said system to the atmosphere.

8. A method of heating by steam utilizing a system comprising a plurality of radiators with vents thereon and an intermittently operating source of steam, in which each cycle comprises the following steps: setting the source of steam in operation; supplying radiators with steam; sealing the system before or about the time the steam source ceases operation; discontinuing the supply of steam; then allowing the steam to condense to create a substantial negative pressure; limiting the development of negative pressure beyond a predetermined maximum; maintaining the system sealed until the negative pressure therein has been reduced to a predetermined minimum; and then opening said system to the atmosphere.

9. A steam heating system comprising a source of steam, a plurality of radiators and connecting piping therebetween, vacuum type venting valves on the radiators, each of said venting valves having thermostatically and negative pressure operated means for closing said valve, a single vacuum control unit connected to the piping, said vacuum control unit having a first valve with thermostatically operated means for closing said first valve, and negative pressure operated means for maintaining said first valve closed between certain negative pressure limits, the temperature at which said first valve closes being substantially less than the temperature at which said venting valves close, the minimum negative pressure necessary to maintain said first valve closed being substantially greater than the negative pressure necessary to maintain said venting valves closed, and said control unit including a second valve having means for causing the temporary reopening thereof to the atmosphere when the negative pressure in the system exceeds the said minimum pressure by at least two inches of mercury.

10. A device of the type described for use in a steam heating system, comprising a single unit forming a closed casing and including two valves in parallel leading from the interior to the exterior of said unit, means for connecting said unit to said system whereby both valves may be influenced simultaneously by conditions existing within the system, the first of said two valves being normally open, means for closing said first valve comprising a thermostatic element operable to move said first valve to closed position under the influence of heat in excess of a predetermined degree, and a pressure operated element subject to the system pressure and operable to move said first valve to closed position when said system pressure reaches a determinable negative degree, the second of said two valves being normally closed, and means operable to open said second valve when the pressure within said unit becomes more negative than a predetermined degree.

11. A device of the type set forth in claim 10, and having means for adjusting said first valve to vary the negative pressure at which said first valve will open and close without affecting the temperature at which said first valve will open and close.

12. A device of the type set forth in claim 10, and having means for adjusting said first valve to vary the negative pressure at which said first valve will open and close under the influence of said pressure operated element alone without affecting the temperature at which said first valve will open and close under the influence of said thermostatic element alone.

13. A device of the type set forth in claim 10, and having means for adjusting said second valve opening means whereby the negative pressure at which said second valve opens may be varied independently of said first valve.

14. A device of the type set forth in claim 10, and having means for adjusting said first valve to vary the negative pressure at which said first valve will open and close without affecting the temperature at which said first valve will open and close, and means for adjusting said second valve opening means whereby the negative pressure at which said second valve opens may be varied independently of said first valve.

15. A device of the type set forth in claim 10, in which said thermostatic element is combined with a buoyant element adapted to close said first valve when liquid has risen to a predetermined point within said casing.

16. A device of the type set forth in claim 10, in which said thermostatic element is combined with a hollow sealed element to form a buoyant member for closing said first valve when liquid has risen to a predetermined point in said casing.

17. A device of the type set forth in claim 10, in which said pressure operated element is positioned so as to be exposed to the interior casing pressure on one side and atmospheric pressure on the other.

18. A device of the type set forth in claim 10, in which the means permitting opening of said second valve is a loaded spring subject to opening movement when the pressure within said casing decreases to a predetermined negative degree to premit the entrance of air into said casing.

19. A device of the type set forth in claim 10, in which the pressure operated element for closing said first valve under conditions of negative pressure within said casing in excess of a predetermined degree comprises a bellows positioned so as to be exposed on one side to the interior casing pressure and on the other side to the atmosphere.

20. A device of the type set forth in claim 10, in which the thermostatic element for closing said first valve is included as part of a sealed float, and in which the pressure operated element is a bellows, and in which the means operable to open said second valve is a loaded spring subject to movement to open said second valve when the pressure within said casing reaches a predetermined negative degree to permit the entrance of air into said casing.

21. A device of the type set forth in claim 10, in which the pressure operated element for closing said first valve comprises a bellows mounted on a hollow adjustable stem and open on one side to the atmosphere, and said thermostatic element is mounted above said bellows, and said valve closing means is mounted on said thermostatic element, and the second of said two valves is maintained closed by a spring adjusted to permit opening of said second valve when the negative pressure within said casing falls to a predetermined negative degree.

22. A steam heating system comprising a source of steam, a plurality of radiators and connecting piping therebetween, vacuum type venting valves on the radiators, each of said venting valves having thermostatically and negative pressure operated means for closing said valve, a single vacuum control unit connected to the piping, said vacuum control unit having a first valve with thermostatically operated means for closing said first valve, and negative pressure operated means for maintaining said first valve closed between certain negative pressure limits, the temperature at which said first valve closes being substantially less than the temperature at which said venting valves close, the minimum negative pressure necessary to maintain said first valve closed being substantially greater than the negative pressure necessary to maintain said venting valves closed, and said control unit including a second valve having means for causing the temporary opening thereof to the atmosphere when the negative pressure in the system exceeds the said minimum pressure by a relatively small predetermined amount.

WARREN T. FERGUSON.